US012335758B2

(12) United States Patent
Kaszuk et al.

(10) Patent No.: US 12,335,758 B2
(45) Date of Patent: Jun. 17, 2025

(54) METHOD AND DEVICE FOR TESTING A BASE STATION

(71) Applicant: Siemens Industry Software Inc., Plano, TX (US)

(72) Inventors: Imre Kaszuk, Kempele (FI); Jari Haapala, Oulu (FI); Miika Niiranen, Pirkkala (FI)

(73) Assignee: Siemens Industry Software Inc., Plano, TX (US)

( * ) Notice: Subject to any disclaimer, the term of this patent is extended or adjusted under 35 U.S.C. 154(b) by 409 days.

(21) Appl. No.: 17/785,473

(22) PCT Filed: Dec. 16, 2019

(86) PCT No.: PCT/US2019/066507
§ 371 (c)(1),
(2) Date: Jun. 15, 2022

(87) PCT Pub. No.: WO2021/126147
PCT Pub. Date: Jun. 24, 2021

(65) Prior Publication Data
US 2023/0021816 A1    Jan. 26, 2023

(51) Int. Cl.
*H04W 24/08* (2009.01)
*H04L 43/50* (2022.01)
(Continued)

(52) U.S. Cl.
CPC ................................ *H04W 24/08* (2013.01)

(58) Field of Classification Search
CPC ..................................................... H04W 24/08
(Continued)

(56) References Cited

U.S. PATENT DOCUMENTS 8,612,530 B1    12/2013 Sapovalovs et al.
10,917,326 B1 *   2/2021 Gintis ................. H04L 43/0817
(Continued)

FOREIGN PATENT DOCUMENTS

CA          2506339        11/2005
CN         102420713         4/2012
(Continued)

OTHER PUBLICATIONS

Agilent Technologies, "RT900 Training Writing XML Files for the Generic PDU Builder", pp. 1-36, Dec. 31, 2003.
(Continued)

*Primary Examiner* — Xuan Lu
(74) *Attorney, Agent, or Firm* — Cozen O'Connor (57) ABSTRACT

A method and device for testing a base station comprising one or more radio units and a baseband unit connectable to the one or more radio units, wherein the device includes a configuration module configured to generate a first test case configuration associated with the one or more radio units and the baseband unit, where the first test case configuration includes a first protocol stack including a first protocol associated with a first layer and a second protocol associated with a second layer, and where a first set of protocol parameters associated with the first protocol is in a first namespace and a second set of protocol parameters associated with the second protocol is in a second namespace that is distinct from the first name space.

12 Claims, 5 Drawing Sheets

(51) Int. Cl.
*H04W 24/06* (2009.01)
*H04W 88/08* (2009.01)

(58) Field of Classification Search
USPC .......................................................... 370/241
See application file for complete search history.

(56) References Cited

U.S. PATENT DOCUMENTS

| | | | |
|---|---|---|---|
| 2003/0223433 A1 | 12/2003 | Lee et al. | |
| 2004/0068681 A1* | 4/2004 | Smith | H04L 43/50 |
| | | | 714/43 |
| 2011/0134880 A1 | 6/2011 | Ait-Ameur et al. | |
| 2014/0160961 A1* | 6/2014 | Dragulescu | H04L 43/50 |
| | | | 370/252 |

FOREIGN PATENT DOCUMENTS

| | | |
|---|---|---|
| CN | 105142159 | 12/2015 |
| CN | 107070862 | 8/2017 |
| KR | 20030080443 | 10/2003 |
| WO | 2015127866 | 9/2015 |

OTHER PUBLICATIONS

PCT International Search Report dated Jul. 31, 2020 based on PCT/US2019/066507 filed Dec. 16, 2019.

* cited by examiner

METHOD AND DEVICE FOR TESTING A BASE STATION

CROSS-REFERENCE TO RELATED APPLICATIONS

This is a U.S. national stage of application No. PCT/EP2019/066507 filed 16 Dec. 2019.

BACKGROUND OF THE INVENTION

1. Field of the Invention

The current disclosure relates to testing and simulation devices and, more particularly, relates to testing and simulation systems/devices used for testing base stations and other radio equipment used in cellular networks, and relates to testing devices used for testing base stations and other radio equipment associated with cellular networks.

2. Description of the Related Art

Current testing systems used for testing of front haul networks are often software-based test systems and utilize software for test case creation, test case analysis, etc. Therefore, for configuration of a test case, a plurality of parameter lists are relied upon.

Often in these test cases, a plurality of communication operations are simulated amongst the various software/hardware components of the base station to ensure that these components are compatible with each other.

In this regard, a testing device for testing a base station with radio units and a baseband unit is known. These testing devices often include a configuration module to generate various test case configurations in relation to various test scenarios in relation to the radio units and the baseband unit.

These test configurations include a plurality of parameters used by the testing devices for simulation of the test cases. These parameters are associated with the type of packets to be simulated in the test case, payload of the packets, frequency of the packets, and/or protocol stack associated with the packet. The parameters associated with the protocol stack define the various protocols of the protocol stack that are layered on one other to process packets according to the protocol specifications. Examples of such protocols include IP protocol (on a network layer), UDP protocol (on a transport layer), and/or TCP protocol (on a transport layer).

This configuration of packet and protocol parameters is achieved by user or test personnel and is often time consuming; requiring considerable manual effort. These test cases often cover a multiplicity of conditions. As a result, a multitude of packet parameters are often to be configured by the user. Accordingly, the possibility of errors made by the users also increases considerably.

In one approach to address this issue, a plurality of packets of a similar type are logically organized at higher level abstraction known as streams. Instead of defining communication parameters of each packet, streams allow users to define the communication parameters of a set of packets belonging to a single stream in a single declaration. For example, for a particular stream (i.e., stream 1), one or more parameters associated with a protocol stack of the packets belonging to stream 1 may be defined or declared using a stream level protocol parameter.

However, such configuration or definition of parameters is still time consuming and require effort. Moreover, a plurality of parameters associated with the testing device may have proprietary names and accordingly may lead to some confusion amongst the test personnel. Accordingly, there is a need for a device and method for testing of base stations which addresses the aspects mentioned above.

SUMMARY OF THE INVENTION

In view of the foregoing, it is an object of the invention to provide a method, a test case configuration repository, a non-transitory storage medium and a device for testing a base station that comprises one or more radio units and a baseband unit connectable to the one or more radio units.

This and other objects and advantages are achieved in accordance with the invention by a device comprising a configuration module configured to generate a first test case configuration associated with the radio units and the baseband unit. The first test case configuration includes a first protocol stack comprising a first protocol associated with a first layer and a second protocol associated with a second layer. In accordance with the invention, a first set of protocol parameters associated with the first protocol is in a first namespace and a second set of protocol parameters associated with the second protocol is in a second namespace, where, the second namespace is distinct from the first name space.

Accordingly, by incorporating namespaces in the first test case configuration, naming of protocol parameters is simplified because two parameters can have the same name while belonging to two separate namespaces (associated with two corresponding protocols). Accordingly, this helps users in utilizing the parameters easily. Additionally, the users can easily search for parameters due to the simplified namespace. This helps to improve the efficacy of the testing device. Moreover, protocol parameters of each protocol are in a separate namespace. As a result, making modifications to a specific protocol parameter does not require the user to check protocol parameters of other protocols for consistency.

By introducing distinct namespaces in test configurations, it is now possible to easily add, remove, or change layers of the protocol stack without having to edit all the parameters in the test configuration. Additionally, it is simpler to relate parameters to standards/specifications, and accordingly, the user knows which document to look at for information or the parameter and is not requires to deduce it from the parameter name alone.

In an embodiment, at least one parameter from the first set of protocol parameters associated with the first protocol includes a value indicative of the second protocol. In another embodiment, the second protocol immediately succeeds the first protocol in the first protocol stack. This helps in checking whether the namespace, as specified by the user for the second protocol, is in line with the value as specified in the first protocol.

In a further embodiment, a name of each parameter from the first set of protocol parameters is based on the first protocol and a name of each parameter from the second set of protocol parameters is based on the second protocol. This helps in easily identifying which protocol the corresponding parameter is related to. Accordingly, there is less need for proprietary parameter names, which helps to improve the usability of the testing device.

In an embodiment, the device for testing the base station, further comprises a simulation module to simulate one or more operations between the one or more radio units and the baseband unit in accordance with the first test case configuration. This allows software aspects of the base station to be tested without requiring expensive equipment.

In another embodiment, the first protocol stack is associated with a first stream, and the simulation module is configured to generate a plurality of packets based on the first stream, such that each packet from the plurality of packets includes a packet header based on the first protocol stack.

In yet another embodiment, the first test case configuration includes a second protocol stack comprising a third protocol associated with the first layer and a fourth protocol associated with the second layer. In an embodiment, the second protocol stack is associated with a second stream. Accordingly, two or more streams may be configured according to the invention for simulation of multiple types of packets.

In a further embodiment, the configuration module includes a graphical user interface (GUI) for receiving a plurality of values associated with the first and second set of protocol parameters associated with the first and second protocols of the first protocol stack. The GUI allows for easy configuration of the protocol parameters.

In another embodiment, a name of each parameter from the first set of protocol parameters includes a namespace token associated with the first protocol. This allows for easy identification of protocol associated with the corresponding parameter by the user and by the simulation module.

It is also an object of the invention to provide a method for testing a base station. The method comprises generating a first test case configuration associated with the one or more radio units and the baseband unit and simulating one or more operations between the one or more radio units and the baseband unit. Simulating the one or more operations comprises generating one or more packets based on the first test case configuration, where each packet from the one or more packets comprises a packet header based on the first protocol stack. The first set of protocol parameters associated with the first protocol are in a first namespace and the second set of protocol parameters associated with the second protocol are in a second namespace, where the second namespace is distinct from the first name space.

In another embodiment, generating the first test case configuration comprises receiving a plurality of values associated with the first and second set of protocol parameters associated with the first and second protocols using a graphical user interface (GUI).

It is also an object of the invention to provide a test case configuration repository one or more test case configurations including the first test case configuration.

It is a further object of the invention to provide a non-transitory storage medium for testing a base station, where the non-transitory storage medium has a plurality of machine-readable instructions stored therein which, when executed by one or more processors, cause the one or more processors to generate a first test case configuration associated with the one or more radio units and the baseband unit, where the first test case configuration includes a first protocol stack comprising a first protocol associated with a first layer and a second protocol associated with a second layer, and cause the one or more processors to simulate one or more operations between the one or more radio units and the baseband unit, where simulating the one or more operations comprises generating one or more packets based on the first test case configuration, where each packet from the one or more packets comprises a packet header based on the first protocol stack, where a first set of protocol parameters associated with the first protocol are in a first namespace and where a second set of protocol parameters associated with the second protocol are in a second namespace, where the second namespace is distinct from the first name space. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which.

DETAILED DESCRIPTION OF THE EXEMPLARY EMBODIMENTS

Figure 1:
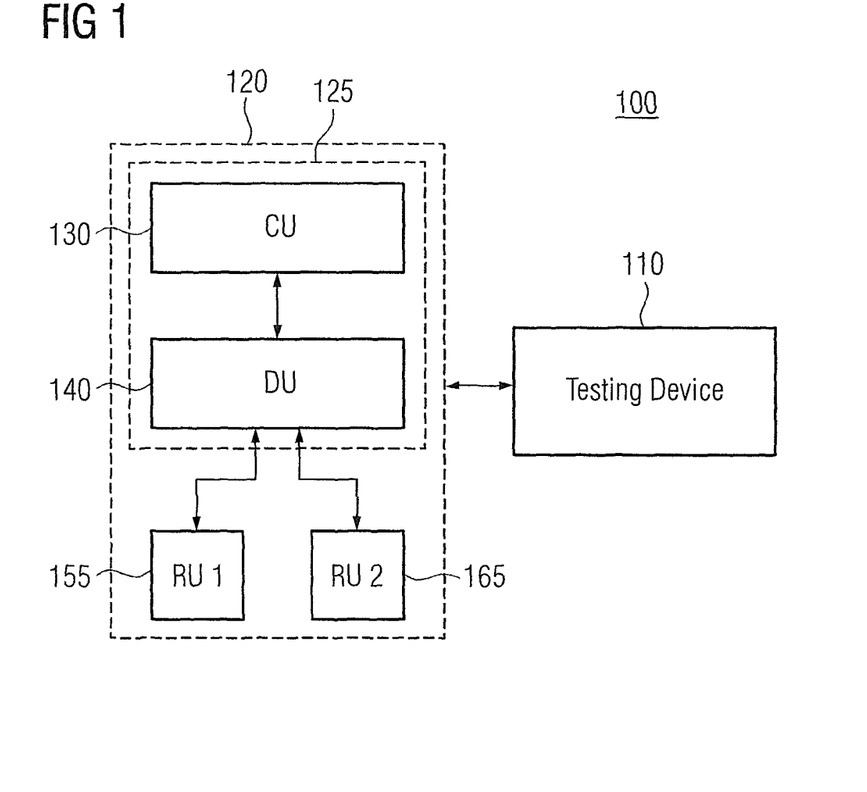
FIG. 1 is a schematic illustration of an exemplary system incorporating a testing device for testing a base station in accordance with the invention.

FIG. 1 illustrates an exemplary system 100 for testing a base station 120. The base station 120 may be connected to a cellular network (not shown in FIG. 1) comprising other base stations and the network core. The base station 120 comprises a central unit 130, one or more distributed units (shown in FIG. 1 as distributed unit 140), and one or more radio units (shown in FIG. 1 as radio units 155, 165). The central unit 130 and the distributed unit 140 is jointly referred to as baseband unit 125. The central unit 130 processes non-real time protocols and services, and the distributed unit 140 processes physical level protocols and latency-critical real time services. The radio units perform link layer and physical layer signal processing when transmitting and receiving radio signals. The connections between the various radio units (155, 165) and the distributed unit 140 are ethernet based protocol stacks and focus on various aspects in relation to the radio units such as antenna data, beamforming control, management, and synchronization. Examples of such protocol stacks include O-RAN with eCPRI or IEEE1914.3 (RoE) as antenna data transport layer and optional UDP over IPv4 or IPv6 as the routable transport layer, etc.

In an embodiment, base station 120 may be a part of a radio access network of a wireless communication system, e.g., a cellular communication system. The wireless communication system may operate according to specifications of Universal Mobile Telecommunication System or any one of its evolution versions, e.g., Long-Term Evolution (LTE) or LTE-Advanced, a second-generation mobile telecommunication system such as Global System for Mobile Communications, or a system operating strictly on unlicensed frequency bands. An example of a system operating on the unlicensed bands is IEEE 802.11 (Wi-Fi) and, as a consequence, the base station may be considered broadly as an access point providing a terminal device with wireless access to other networks such as the Internet.

The system 100 comprises a testing device 110 for testing and simulating various operations amongst the components of the base station 120. The testing device 110 is be connected to one or more interfaces of the base station 120 so as to test one or more features or performance of the base station 120. Examples of the interfaces include an interface between the baseband unit 125 and the radio units (155, 165), and/or the interface between the base band unit 125 and the core network. The base station 120 may comprise physical connectors to which the testing device 110 may be connected in order to test the operation and performance of the base station. Such physical connectors may include BNC connectors, optical connectors such as LC, SMA connectors, RJ45 connectors, small form-factor (SFP or SFP+) connectors, and/or quad SFP(+) connectors.

In an embodiment, the testing device 110 may comprise a network interface connecting the testing the device 110 to a communication network (not shown in FIG. 1). The communication network may comprise a local area network (LAN), a wide area network (WAN), and/or the Internet. The network interface may enable remote controlling of the testing device, connection with a remote database storing test programs and/or test results, and/or communication between two or more mutually remote testing devices. A user interface device such as a personal computer or a laptop computer may be connected to the communication network and configured to control the testing of the base station.

The testing device 110 is configured to generate a plurality of packets to be transmitted between the various components of the base station 120. For generating the packets, the testing device 110 includes a configuration module that is configured to generate one or more test case configurations. Each test case configuration from the one or more test case configurations, includes a plurality of parameters in accordance to which the packets are generated by a simulation module of the testing device 110. In an embodiment, the configuration module includes a graphical user interface for receiving a plurality of values for the plurality of parameters of the test case configurations.

Figure 2:
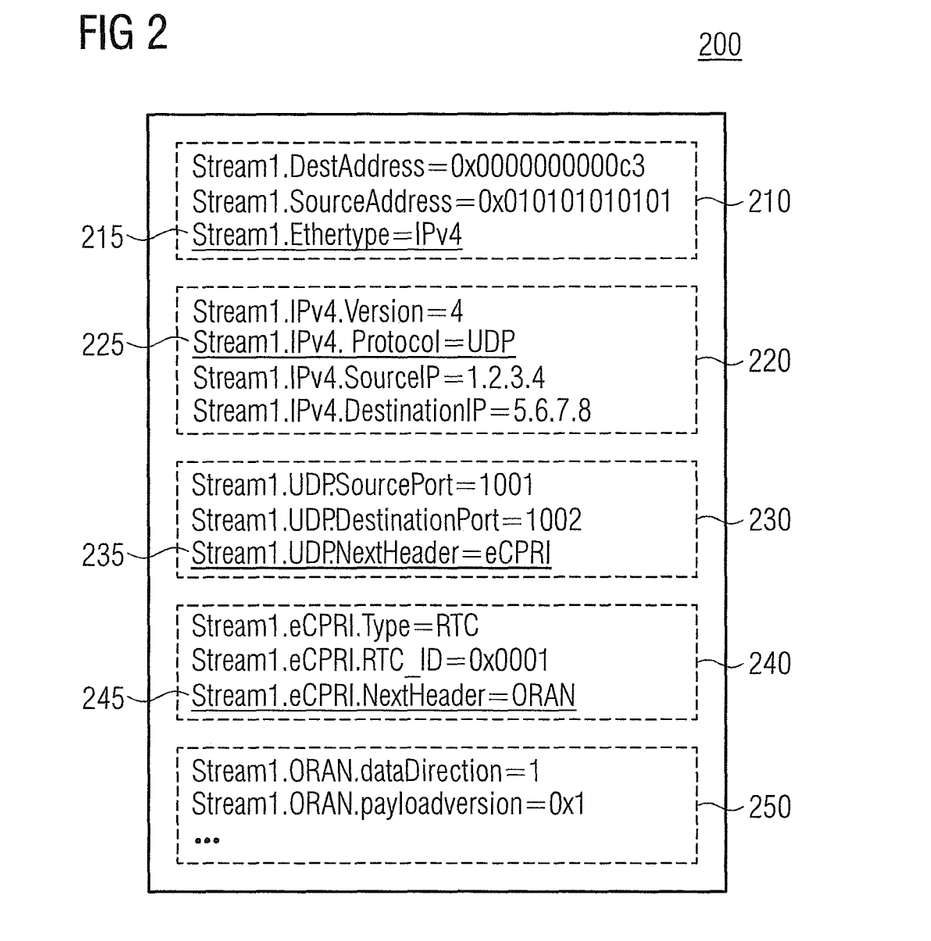
FIG. 2 is a schematic illustration of an exemplary test case configuration for testing the base station in accordance with the invention.

FIG. 2 illustrates a test case configuration 200 (also referred to as first test case configuration 200) for testing the base station 120. In an embodiment, the first test case configuration 200 is generated by the configuration module based one or more user inputs. The first test case configuration 200 includes a first protocol stack associated with a first stream (also referred to as stream 1 in FIG. 2). The first protocol stack as defined in the configuration 200 is used by the simulation module for generating packets associated with the first stream. For example, the packet headers of the packets belonging to the first stream are generated in accordance with the first protocol stack associated with the first stream.

The first protocol stack comprises a plurality of protocols running concurrently for processing protocol data units (such as datagrams, data frames, and/or packets) in accordance with the specifications of each protocol of the protocol stack. Each protocol from the protocol stack is associated with a layer of an interconnection suite (similar to the layers of OSI interconnection model or TCP/IP interconnection model). Each protocol is stacked on top of a preceding protocol in the protocol stack. This means that received a data unit is first processed by the preceding protocol and then by the succeeding protocol. Similarly, a data unit to be transmitted is first processed by the succeeding protocol and then by the preceding protocol.

Figure 3:
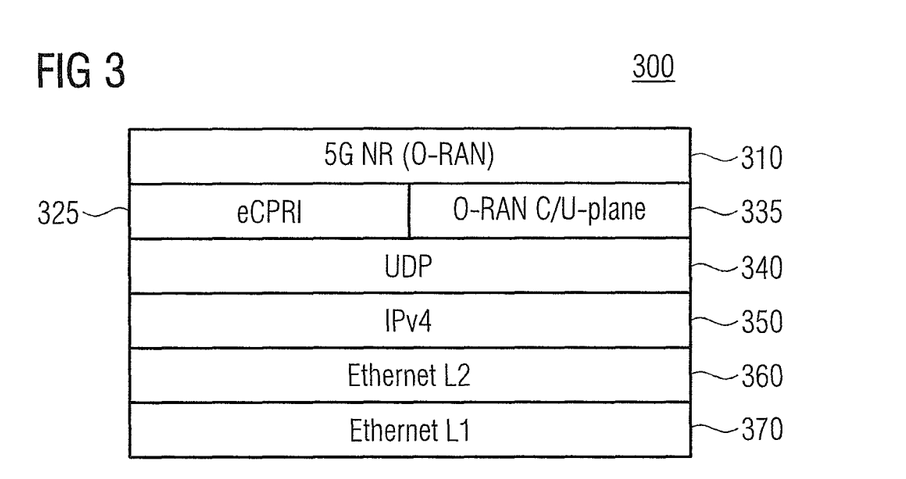
FIG. 3 is a schematic illustration of an exemplary protocol stack for testing the base station in accordance with the invention.

FIG. 3 illustrates (a diagrammatic representation) of the first protocol stack 300. The first protocol stack 300 comprises six protocols stacked on each other to form the protocol stack 300. The first layer of the protocol stack 300 is based on ethernet protocol (shown as protocol block 370). The second layer of the protocol stack 300 is based on ethernet protocol (shown as protocol block 360). The third layer of the protocol stack 300 is based on internet protocol (IP) (shown as protocol block 350). The fourth layer of the protocol stack 300 is based on user datagram protocol (UDP) (shown as protocol block 340). The fifth layer of the protocol stack 300 is based on eCPRI (shown as protocol block 325) and O-RAN C/U plane specifications (shown as protocol block 335). Finally, the sixth layer of the first protocol stack 300 is based on the 5G New Radio specifications (shown as protocol block 310).

The protocols of the first protocol stack 300 and associated protocol parameters are defined in the test case configuration 200. Particularly, each set of protocol parameters associated with a corresponding protocol is in a separate and distinct namespace from other sets of protocol parameters associated with the other protocols of the protocol stack 300. Namespace herein refers to a logical area accommodating a plurality of parameter names such that two parameters having the same parameter name can co-exist in two separate namespaces without conflict. In other words, each namespace provides a logical context in which those parameters may exist without overlapping with parameters in other namespaces. In an embodiment, each namespace associated with the corresponding protocol is specified as a token in the parameter name of each protocol parameter associated with the corresponding protocol.

For example, as shown in FIG. 2, parameters associated with the IP protocol on layer 3 (i.e., protocol block 350) are defined in code segment 220 of the test case configuration 200. The protocol parameters associated with IP protocol (such as source IP address, and/or destination IP address) are in a first namespace associated with the IP protocol (IPv4 in the current example). Accordingly, each protocol parameter name includes an 'IPv4' token in its name to indicate the first namespace associated with the IPv4 protocol.

Similarly, parameters associated with the UDP protocol on layer 4 (i.e., protocol block 340) are defined in code segment 230 of the test case configuration 200. The protocol parameters associated with UDP protocol (such as source UDP port, and/or destination UDP port) are in a second namespace associated with the UDP protocol. Accordingly, each protocol parameter name includes a 'UDP' token in its name to indicate the second namespace associated with the UDP protocol.

Accordingly, this allows for two parameters having the same name to exist in two separate namespaces without conflict. For example, a parameter indicative of the version of the IP protocol can have the parameter name 'version' along with the parameter indicative of the version of the UDP protocol without any conflict. This is possible because the parameter name of the parameter indicative of the version of the IP protocol includes the namespace token 'IPv4' (i.e., stream1.IPv4.version) and, similarly, the parameter name of the parameter indicative of version of the UDP protocol includes the namespace token 'UDP' (i.e. stream1.UDP.version).

Similarly, parameters associated with the eCRPI protocol on layer 5 (i.e., protocol block 325) are defined in code segment 240 of the test case configuration 200. The protocol parameters associated with eCPRI protocol (such as type, RTC_ID) are in a third namespace associated with the eCPRI protocol. Accordingly, each protocol parameter name includes a 'eCPRI' token in its name to indicate the third namespace associated with the eCPRI protocol. Similarly, parameters associated with the O-RAN NR protocol on layer 6 (i.e., protocol block 310) are defined in code segment 250 of the test case configuration 200. The protocol parameters associated with O-RAN NR protocol (such as data direction, and/or payload version) are in a fourth namespace associated with the O-RAN NR protocol. Accordingly, each protocol parameter name includes a 'ORAN' token in its name to indicate the fourth namespace associated with the O-RAN NR protocol. Similarly, parameters associated with the ethernet protocol on layer 2 (i.e., protocol block 360) are defined in code segment 210 of the test case configuration 200. The protocol parameters associated with ethernet protocol (such as type, and/or source address) are in a fourth namespace associated with the ethernet protocol.

Additionally, in an embodiment, at least one parameter from the first set of protocol parameters associated with the first protocol includes a value indicative of the second protocol. In an embodiment, the second protocol is a layer immediately succeeding the first protocol in the first protocol stack. For example, as shown in FIG. 2, the ethernet protocol (protocol block 360) includes a parameter 'ethertype' that includes a value indicative of the next protocol 'IPv4' as shown on line 215. Similarly, the IP protocol (protocol block 350) includes a parameter 'protocol' that includes a value indicative of the next protocol 'UDP' as shown on line 225. Similarly, the UDP protocol (protocol block 340) includes a parameter 'NextHeader' that includes a value indicative of the next protocol 'eCPRI' as shown on line 235. By including a reference of the succeeding protocol in the parameter set of the first protocol, the configuration module is configured to set the following namespace of the succeeding protocol.

The first test case configuration 200 is used by the simulation module of the testing device 110 to simulate the one or more operations between the radio units (155, 165) and the baseband unit (125). In an embodiment, the one or more operations include simulation of transmission and reception of packets in relation to the base station 120. Here, the simulation module generates a plurality of packets in accordance with the first stream as defined in the first test case configuration 200. A plurality of stream properties may be defined in relation to first stream in the first test case configuration 200. Some examples of the stream properties include stream direction (indicative of whether a stream of packets is in the Uplink direction, i.e., up from the UE towards core network, or Downlink direction, i.e., down from the core network towards the UE), stream type, stream priority, and/or packet type. Examples of stream types include Control Plane Downlink (CP DL), Control Plane Uplink (CP UL), User Plane DL (UP DL), and User Plane Uplink (UP UL) streams for carrying antenna data between O-DU and O-RU.

Figure 4:
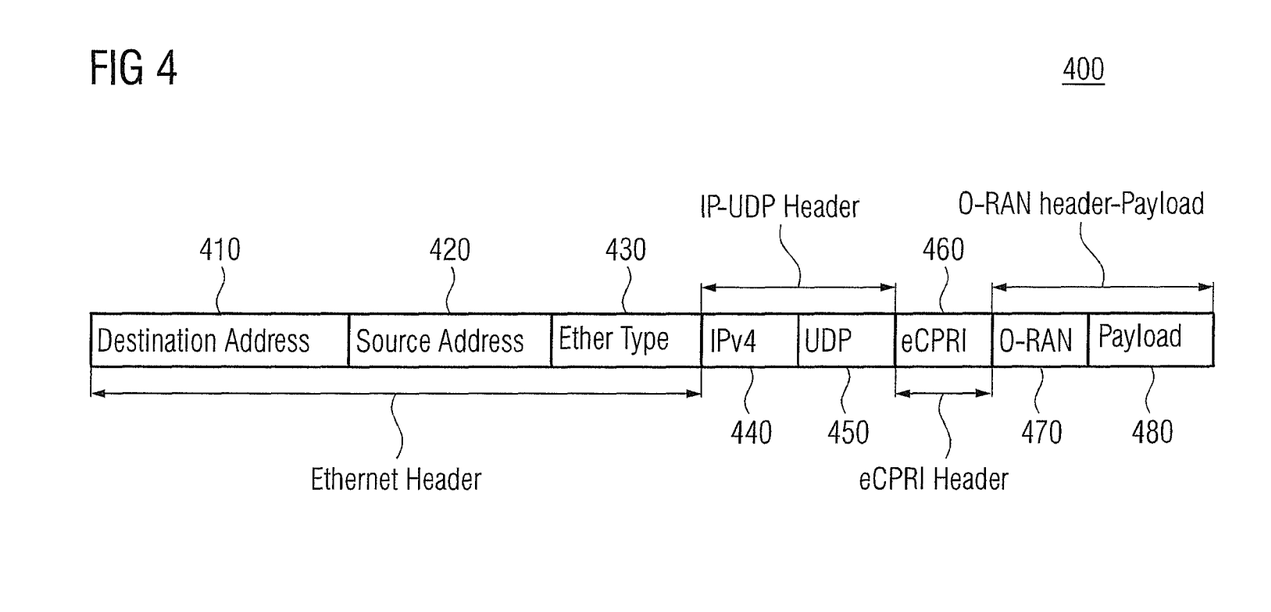
FIG. 4 is a schematic illustration of an exemplary packet header of a packet generated in accordance with the example protocol stack in accordance with the invention.

Accordingly, the packet types, formats and the headers are based on the first protocol stack 300. For example, as shown in FIG. 4, each packet of the first stream has a packet header format 400 in accordance with the protocol stack 300. Accordingly, the packet header format 400 includes ethernet header comprising a plurality of sections (for example, destination address section 410, source address section 420, ethertype section 430). The ethernet header is associated with the ethernet protocol (i.e., protocol block 360). Similarly, the packet header format 400 includes an IP-UDP header (shown as IP-UDP sections 440-450). The IP-UDP header is associated with the IP and UDP protocols of the first protocol stack 300 (i.e., protocol blocks 350 and 340). Similarly, the packet header format 400 includes an eCPRI header (shown as section 460). The eCPRI header is associated with the eCPRI protocol of the first protocol stack 300 (i.e., protocol block 325). Similarly, the packet header format 400 includes an O-RAN header (shown as section 470). The O-RAN header is associated with the O-RAN 5G NR protocols of the first protocol stack 300 (i.e., protocol blocks 310).

While the first test case configuration 200 is explained using a first protocol stack 300 associated with the first stream, in an embodiment, the first test case configuration 200 includes a plurality of streams and a plurality of corresponding protocol stacks. Accordingly, the first test case configuration 200 may include a second stream and a second protocol stack. The second protocol stack may include the same number of layers as the first protocol stack while having different protocols from the first protocol stack 300. For example, instead of UDP protocol in the fourth layer, the second protocol stack may include TCP protocol (also known as third protocol) in the fourth layer. Similarly, instead of IPv4 protocol in the third layer, the second protocol stack may include IPv6 (also known as fourth protocol) in the third layer.

Figure 5:
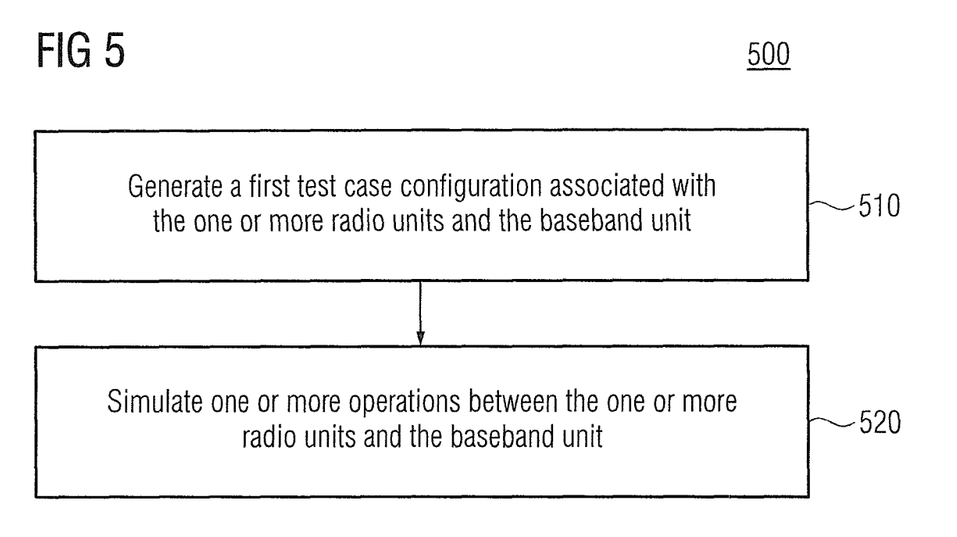
FIG. 5 is a flowchart of an exemplary schematic method for testing the base station in accordance with the invention.

FIG. 5 illustrates a method 500 for testing a base station 110. The method 500 is realized by the testing device 110. The method 500 comprises generating (shown in FIG. 5 as step 510), by the configuration module of the device 110, the first test case configuration 200 associated with the one or more radio units (155, 165) and the baseband unit 125. As mentioned previously, the first test case configuration 200 includes the first protocol stack 300. The first protocol stack 300 comprises two or more protocols including a first protocol (for example, protocol block 325) associated with a first layer and a second protocol (for example, protocol block 310) associated with a second layer. In an embodiment, the configuration module includes a graphical user interface (GUI) for receiving a plurality of values associated with a first and second set of protocol parameters associated with the first and second protocols.

Next, at step 520, the simulation module of the device 110 then simulates one or more operations between the one or more radio units and the baseband unit. For simulating the one or more operations, the simulation module generates one or more packets based on the first test case configuration. In an example, each packet of one or more packets of the first stream comprise a packet header based on the first protocol stack 300. Additionally, as mentioned previously, the first set of protocol parameters associated with the first protocol 325 are in a first namespace 240 and similarly, the second set of protocol parameters associated with the second protocol 310 are in the second namespace 250, the second namespace 250 being distinct from the first name space 240.

The present disclosure can take a form of a computer program product comprising program modules accessible from computer-usable or computer-readable medium storing program code for use by or in connection with one or more computers, processing units, or instruction execution system. For example, the configuration module may be realized across one or more devices.

Figure 6:
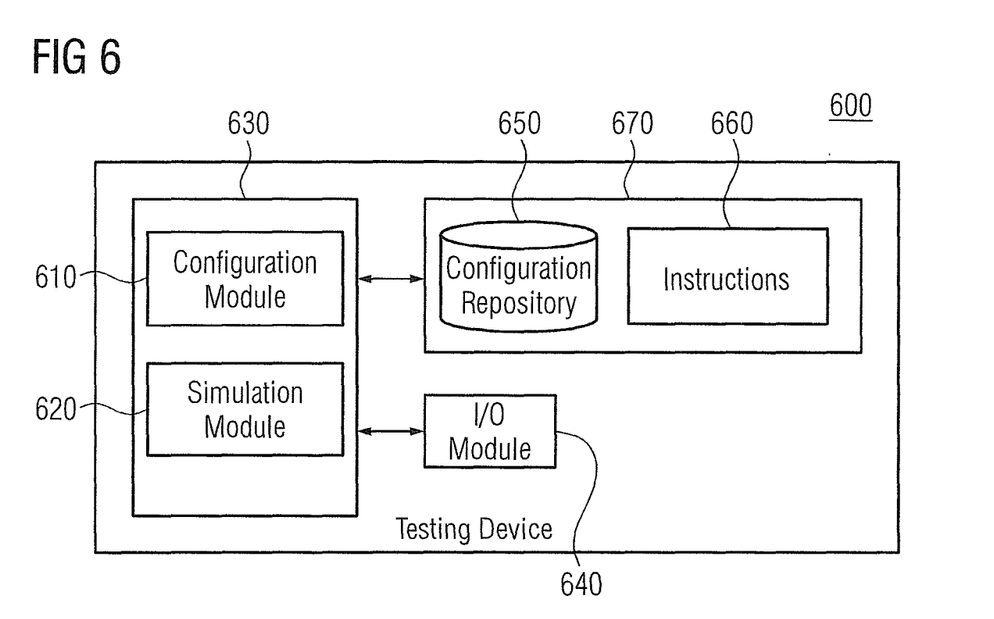
FIG. 6 is a schematic illustration of an exemplary a test device for testing a base station in accordance with the invention.

Accordingly, the current disclosure as describes an exemplary testing device 600. The testing device 600 includes an Input/Output (I/O) module 640, one or more processors 630 and a non-transitory storage medium 670. The non-transitory storage medium 670 contains a plurality of instructions 660 for testing the base station 120. In an embodiment, the configuration module 610 and the simulation module 620 are realized by the one or more processors 630. Upon execution of the instructions 660, the one or more processors generate a first test case configuration associated with the one or more radio units and the baseband unit, where the first test case configuration includes a first protocol stack comprising a first protocol associated with a first layer and a second protocol associated with a second layer; and simulate one or more operations between the one or more radio units and the baseband unit, where simulating the one or more operations comprises generating one or more packets based on the first test case configuration, where each packet from the one or more packets comprises a packet header based on the first protocol stack, where a first set of protocol parameters associated with the first protocol are in a first namespace and where a second set of protocol parameters associated with the second protocol are in a second namespace that is distinct from the first name space.

While the current disclosure describes the testing device 600 as an independent component or device, the testing device 600 may be a software component and may be realized within the base station 120 or any other management device in the network. Similarly, in an embodiment, one or more components of the base station 120 may be actual physical components or logical simulations simulated with the testing device 110 or any other testing/simulation device connected to the testing device 110. For example, the one or more radio units (155, 165) may be simulated on another testing device connected to the baseband unit 125 and the testing device 110.

In an embodiment, the non-transitory storage medium 670 includes configuration repository 650. The configuration repository 670 (also referred to as test case configuration repository 650) includes one or more test case configurations generated by the configuration module 610. The one or more test case configurations includes the first test case configuration 200. Test personnel can select a test case configuration from the test case configurations to be tested using the simulation module 620 for testing the base station 120.

For purposes of the disclosure, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for testing a base station comprising one or more radio units and a baseband unit connectable to the one or more radio units, the device comprising:
   a) a configuration module configured to generate a first test case configuration associated with the at least one radio unit and the baseband unit, the first test case configuration including a first protocol stack comprising a first protocol associated with a first layer and a second protocol associated with a second layer;
   wherein a first set of protocol parameters associated with the first protocol is in a first namespace;
   wherein a second set of protocol parameters associated with the second protocol is in a second namespace, the second namespace being distinct from the first namespace;
   wherein at least one parameter from the first set of protocol parameters associated with the first protocol includes a protocol parameter name indicative of a name of the second protocol; and
   wherein the second protocol succeeds the first protocol in the first protocol stack.

2. The device as claimed in claim 1, wherein a name of each parameter from the first set of protocol parameters is based on the first protocol and a name of each parameter from the second set of protocol parameters is based on the second protocol.

3. The device as claimed in claim 1, further comprising:
   a simulation module which simulates at least one operation between the at least one radio unit and the baseband unit in accordance with the first test case configuration.

4. The device as claimed in claim 3, wherein the first protocol stack is associated with a first stream; and
   wherein the simulation module is configured to generate a plurality of packets based on the first stream, each packet from the plurality of packets including a packet header based on the first protocol stack.

5. The device as claimed in claim 1, wherein the first test case configuration includes a second protocol stack associated with a second stream, the second protocol stack comprising a third protocol associated with the first layer and a fourth protocol associated with the second layer.

6. The device as claimed in claim 1, wherein the configuration module includes a graphical user interface for receiving a plurality of protocol parameter names associated with the first and second set of protocol parameters associated with the first and second protocols.

7. The device as claimed in claim 1, wherein a name of each parameter from the first set of protocol parameters includes a namespace token associated with the first protocol.

8. A test case configuration repository in accordance with claim 1, the test case configuration repository comprising at least one test case configuration including the first test case configuration.

9. A method for testing a base station comprising at least one radio unit and a baseband unit connectable to the at least one radio unit, the method comprising:
   a) generating a first test case configuration associated with the at least one radio unit and the baseband unit, the first test case configuration including a first protocol stack comprising a first protocol associated with a first layer and a second protocol associated with a second layer; and
   b) simulating at least one operation between the at least one radio unit and the baseband unit, said simulating the at least one operation comprising generating at least one packet based on the first test case configuration, each packet from the at least one packet comprising a packet header based on the first protocol stack;
   wherein a first set of protocol parameters associated with the first protocol is in a first namespace;
   wherein a second set of protocol parameters associated with the second protocol is in a second namespace which is distinct from the first namespace; and
   wherein at least one parameter from the first set of protocol parameters associated with the first protocol includes a protocol parameter name indicative of a name of the second protocol.

10. The method as claimed in claim 9, wherein generating the first test case configuration comprises receiving a plurality of protocol parameter names associated with the first and second set of protocol parameters associated with the first and second protocols utilizing a graphical user interface.

11. A test case configuration repository in accordance with claim 9, the test case configuration repository comprising at least one test case configuration including the first test case configuration.

12. A non-transitory storage medium for testing a base station comprising at least one radio unit and a baseband unit connectable to the at least one radio unit, the non-transitory storage medium having machine-readable instructions stored therein which, when executed by at least one processor, cause the at least one processor to:
   a) generate a first test case configuration associated with the at least one radio unit and the baseband unit, the first test case configuration including a first protocol stack comprising a first protocol associated with a first layer and a second protocol associated with a second layer; and
   b) simulate at least one operation between the at least one radio unit and the baseband unit, said simulating the at least one operation comprising generating at least one packet based on the first test case configuration, each packet from the at least one packets comprising a packet header based on the first protocol stack;
   wherein a first set of protocol parameters associated with the first protocol are in a first namespace; and
   wherein a second set of protocol parameters associated with the second protocol are in a second namespace which is distinct from the first name space namespace; and
   wherein at least one parameter from the first set of protocol parameters associated with the first protocol includes a protocol parameter name indicative of a name of the second protocol.

* * * * *